(12) United States Patent
Weisenberg

(10) Patent No.: US 8,402,911 B1
(45) Date of Patent: Mar. 26, 2013

(54) MULTI-SEGMENTED APPARATUS FOR LINING PIPE WITH MULTIPLE CONVOLUTED BENDS AND VARIED ORIENTATIONS WITH A STRUCTURAL MEMBRANE

(75) Inventor: Kent Weisenberg, Englewood, FL (US)

(73) Assignee: Quest Inspar, LLC, Kent, WA (US)

( * ) Notice: Subject to any disclaimer, the term of this patent is extended or adjusted under 35 U.S.C. 154(b) by 0 days.

(21) Appl. No.: 13/552,714

(22) Filed: Jul. 19, 2012

(51) Int. Cl.
  B05B 13/06 (2006.01)
  B05D 7/22 (2006.01)
  C23C 18/00 (2006.01)

(52) U.S. Cl. ............. 118/306; 118/317; 118/DIG. 10; 427/236; 427/427.3; 104/138.2

(58) Field of Classification Search ............. 118/306, 118/321, DIG. 10; 427/427.3, 236; 104/138.2; 700/245; 74/490.05
See application file for complete search history.

(56) References Cited

U.S. PATENT DOCUMENTS

| | | | | |
|---|---|---|---|---|
| 2,461,517 A * | 2/1949 | Carnevale | ............... | 118/306 |
| 3,135,629 A | 6/1964 | McLean | | |
| 3,946,459 A * | 3/1976 | Armstrong | ............... | 15/377 |
| 4,064,293 A * | 12/1977 | Nicklas | ............... | 427/236 |
| 4,602,591 A | 7/1986 | Matsuda | | |
| 4,628,613 A | 12/1986 | Laymon | | |
| 4,938,167 A * | 7/1990 | Mizuho et al. | ............... | 118/713 |
| 4,941,511 A * | 7/1990 | Johansen et al. | ............... | 138/89 |
| 5,172,639 A | 12/1992 | Wiesman | | |
| 5,309,844 A * | 5/1994 | Zollinger | ............... | 104/138.2 |
| 5,878,783 A | 3/1999 | Smart | | |
| 6,171,398 B1 * | 1/2001 | Hannu | ............... | 118/306 |
| 6,450,104 B1 * | 9/2002 | Grant et al. | ............... | 104/138.2 |
| 6,699,324 B1 * | 3/2004 | Berdin et al. | ............... | 118/306 |
| 6,887,014 B2 | 5/2005 | Holland | | |
| 6,996,950 B2 * | 2/2006 | Reddy et al. | ............... | 53/412 |
| 7,154,362 B2 * | 12/2006 | Ohnstein et al. | ............... | 335/229 |
| 7,181,985 B2 | 2/2007 | MacMillan | | |
| 7,591,901 B1 | 9/2009 | Weisenberg | | |
| 7,597,048 B2 * | 10/2009 | Nicholson | ............... | 104/138.2 |
| 7,992,514 B1 | 8/2011 | Weisenberg | | |
| 2008/0098834 A1 * | 5/2008 | Sergoyan et al. | ............... | 73/866.5 |
| 2008/0233293 A1 * | 9/2008 | Borgne et al. | ............... | 427/348 |
| 2010/0234988 A1 * | 9/2010 | Buckingham et al. | ............... | 700/245 |
| 2011/0244125 A1 | 10/2011 | Weisenberg | | |
| 2012/0213913 A1 * | 8/2012 | Dominguis Perez et al. | ..... | 427/9 |

* cited by examiner

Primary Examiner — Dah-Wei Yuan
Assistant Examiner — Karl Kurple
(74) Attorney, Agent, or Firm — David McEwing

(57) ABSTRACT

The invention provides an improved method and robotic apparatus for applying a structural membrane lining in conduits. The remotely controlled robot comprises a series of segment blocks maintained in alignment by flexible linear rods supported in spherical swivel bushings. The rods allow for articulation as the robot negotiates bends. Segment blocks include radial guide finger pinions and guide fingers for concentric positioning. Fingers are of engineered plastics and brass to provide ballast weight for perpendicular alignment and contain high frequency air turbine vibrators. Steering vertebrae are included to maintain concentricity of the lining dissipation cup through bends. Also included are electric servo motors controlling cables and take up wheels controlling the angle of the segment blocks.

15 Claims, 5 Drawing Sheets

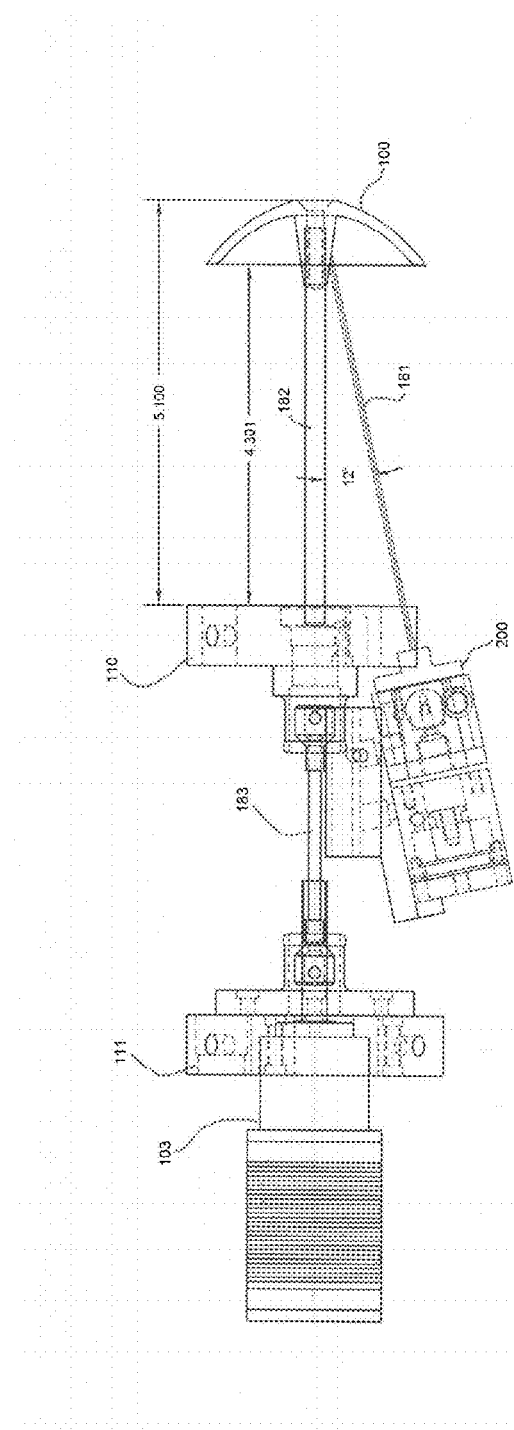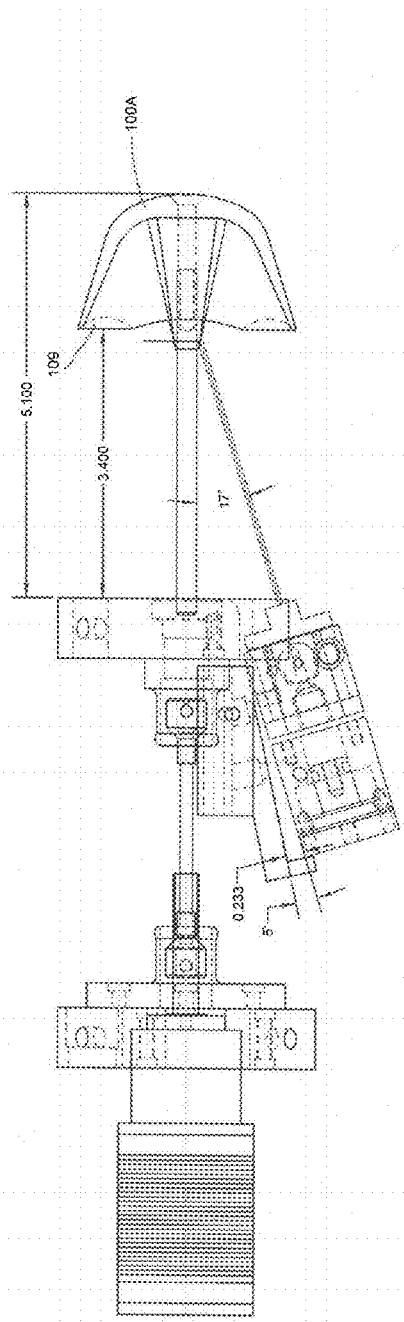
Figure 4
Figure 5

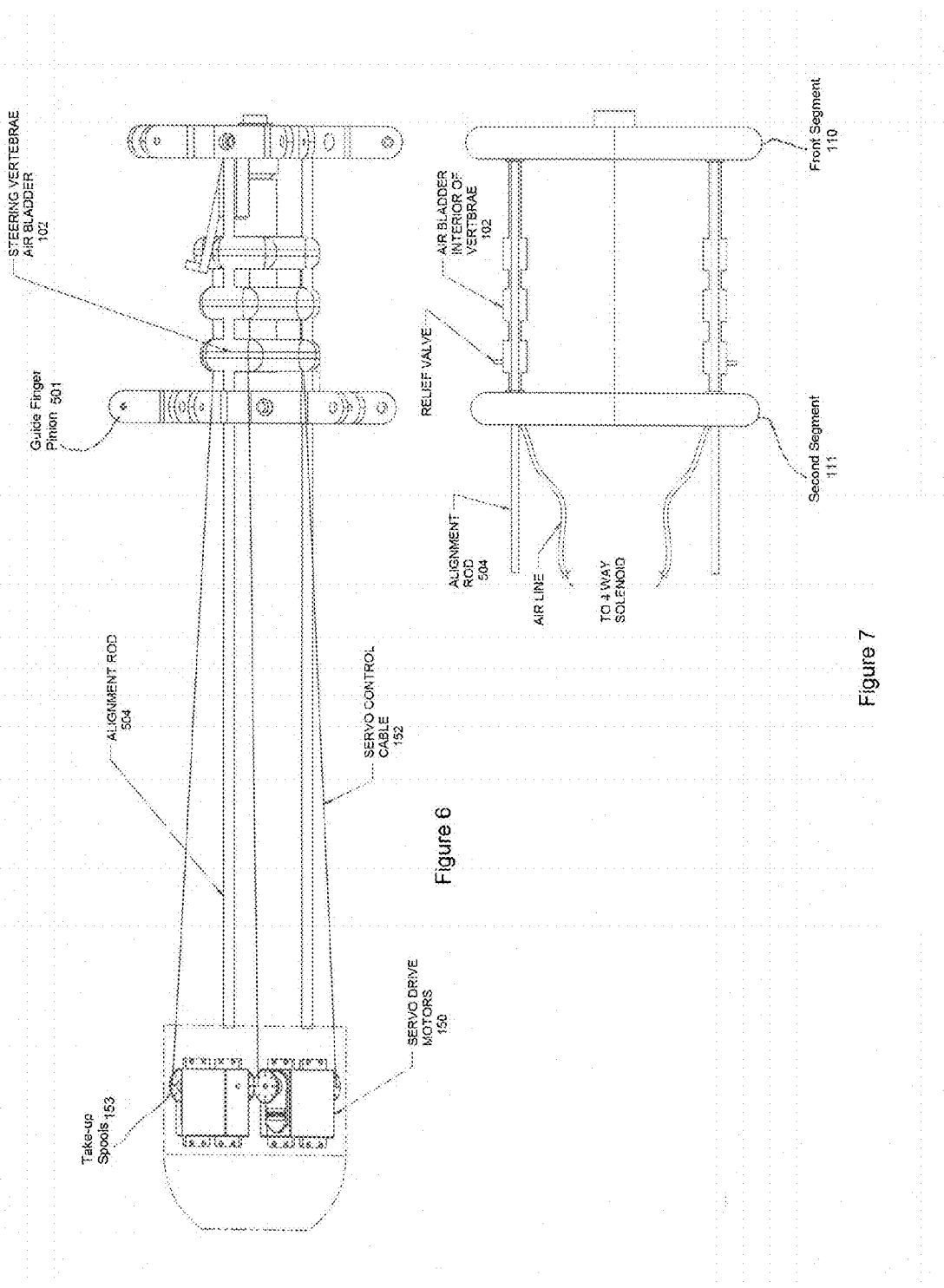

MULTI-SEGMENTED APPARATUS FOR LINING PIPE WITH MULTIPLE CONVOLUTED BENDS AND VARIED ORIENTATIONS WITH A STRUCTURAL MEMBRANE

BACKGROUND OF DISCLOSURE

1. Field of Use

The disclosure illustrates a novel method and apparatus to line pipes containing tortuous elbows and bends.

2. Description of Related Art

Prior art demonstrates numerous methods to line pipelines, conduits and passageways with an in situ pipe line spray apparatus in order to restore asset integrity. Though several of the prior art submissions suggest viability in straight line pipe geometries it is our intent to demonstrate that the prior art methods and apparatus' cannot effectively produce a consistent lining or membrane in pipelines and conduits containing standard pipe fitting bends whereas the present invention can.

Throughout the US and much of the world, most pipelines and conduits are built to standards that dictate internal pipe dimensions, wall thickness, connection geometries and bend radii among other specifications. A typical pipeline comprises a majority of straight pipe lengths but also contains a number of direction changes constructed of standard pipe fittings. 45° and 90° elbows are common. For example, a typical bend radius for a standard wall 8 inch pipe is 12 inches. This is a tortuous bend for a pipe lining robot with all of its mechanical devices to traverse.

In Davis, U.S. Pat. No. 6,986,813, the patent teaches a sprayed in place pipe lining apparatus and method thereof. While this may be a feasible operation for short length, large diameter straight pipe, the equipment of the prior art, due to its overall length, cannot be inserted or retracted from an underground pipe with the access being a manhole or vault with a diameter or horizontal dimension of less than 5 feet. Neither can the device negotiate even a simple 45° bend in a line. There are also limitations in diameter where the smallest viable pipe size is greater than 6 inches.

Some prior art lining devices can traverse 90 degree bends provided that the lining device's overall length is not more than 2" greater than the pipe I.D. This is a severe restriction. Also that even though the lining device can traverse the 90° bend, it would not be able to spray consistent liner thickness as the dissipation device would be in immediate proximity to the outside radius of the pipe wall. Not only would there be extremely heavy build-up on this area of the bend but more than likely there would be minimal and most likely no lining material on the inside radius of the bend. More importantly the lining device may have a catastrophic failure due to lining material velocity and the subsequent rebound of the lining material back onto the dissipation device due to its close proximity and angle of trajectory. The apparatus of the present disclosure avoids these limitations.

Weisenberg, U.S. Pat. No. 7,591,901 improves on these shortcoming by streamlining the profile of the stated apparatus and adding articulation junctures between the housings and the reciprocation head to help the device navigate slight offsets and protrusions in a pipeline. Review of the description and drawings demonstrate it would be impossible to be short enough or narrow enough to navigate a typical pipe bend in a pipe of less than 30 inches in radius while maintaining concentricity of the dissipation device. Diameter restrictions again apply here where the stated limitation is 5.5 inches.

It is therefore desirable to present an invention that can apply a uniform structural membrane in pipelines and conduits that can readily navigate typical pipe size fittings and bends in diameters down to 4 inches. The accompanying specification, through the disclosure, drawings and claims, will teach a method and apparatus to accommodate these needs.

SUMMARY OF THE INVENTION

This invention teaches an improved, in situ pipe liner spray apparatus and method that allows spraying of an isocyanate and amine resin mixture or other mixtures onto the entire circumference of a pipe interior wall. The mixture can line the pipe walls. The lining components are mixed in correct proportion in an impingement block of the apparatus within the pipe. The components may be heated within the apparatus for fast reaction and curing on the pipe walls. Particularly, the impingement block (mixing chamber) may be heated. This uniform heating prevents irregularities or other undesirable variations of the lining layer. The articulated design allows the device to navigate tortuous bends up to 90 degrees in pipelines as small as 4 inches in diameter while applying linings with uniform thicknesses.

The apparatus consists of a robot containing mechanical, electromechanical, pneumatic, hydraulic and electronic components as well as a detachable umbilical with product delivery lines, pneumatic lines along with electrical power and signal and video lines contained within. The umbilical remains attached to the robot during the lining operation. A strength member may also be included in the umbilical to provide tensile support as the umbilical is used to pull the robot though the pipe as well as provide the above mentioned utilities.

The invention teaches a lining apparatus robot constructed of a series of segment blocks or plates that are joined by a center spring bendable steel wire to maintain longitudinal spacing while remaining flexible and capable of returning to its original, straight line configuration. The segment blocks or plates are also held in alignment by several semi-rigid linear alignment rods passing through spherical swivel bearings located radially in the segment blocks. The segment blocks also have attached radially, guide finger pinion rings and perpendicular pivoting guide fingers. All components are located between these segment blocks and attached to only one side of each segment block. i.e., components are not attached to two segment blocks. This component architecture allows for complete articulation of the robot as each segment block with guide finger pinion rings and guide fingers is allowed to move independently.

The lining apparatus robot comprises a high speed electric motor capable of spinning up to 40,000 rpm and is remotely adjustable in both speed and direction. The motor is mounted on one segment block (motor segment block) and attached to the front segment block via a flexible drive shaft. The flexible drive shaft communicates with a shaft mounted in a bearing housing. The shaft is connected to a mechanical oscillator which moves the shaft in and out longitudinally utilizing the rotational energy and converting it to linear, reciprocating motion. The distal end of the shaft connects to a dissipation device shaped as two asymmetrical reversely aligned cones with a center top attached to the shaft and with an acute angled flange oriented to the reciprocating shaft. The periphery edge of the dissipation device can also be scalloped to induce a widened spray pattern. The dissipation device can also have a more flatten disk shape.

The space between the front segment block and the motor segment block houses steering vertebrae which surround the linear alignment rods and are capable of expanding and retracting according to a remote control to maintain the dissipation device in an alignment perpendicular to the centerline of the pipe. This ensures that the dissipation device is centered while the lining apparatus robot navigates bends in a pipe. The dissipation device, i.e., spinning or rotating cones or disks, extends several inches e.g., 5 inches, beyond the front segment block.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 4 is a side view showing an embodiment of the spinning dissipation disk and its relationship to the impingement block.

FIG. 5 is a side view of a second embodiment of the spinning dissipation device.

FIG. 6 is a side view of the first and second segment blocks illustrating the guide finger pinions, servo motors, cable and take up wheel.

FIG. 7 is a side view of the first and second segments and the air bladder of the steering vertebrae and alignment rod.

DETAILED DESCRIPTION OF DISCLOSURE

Figure 1:
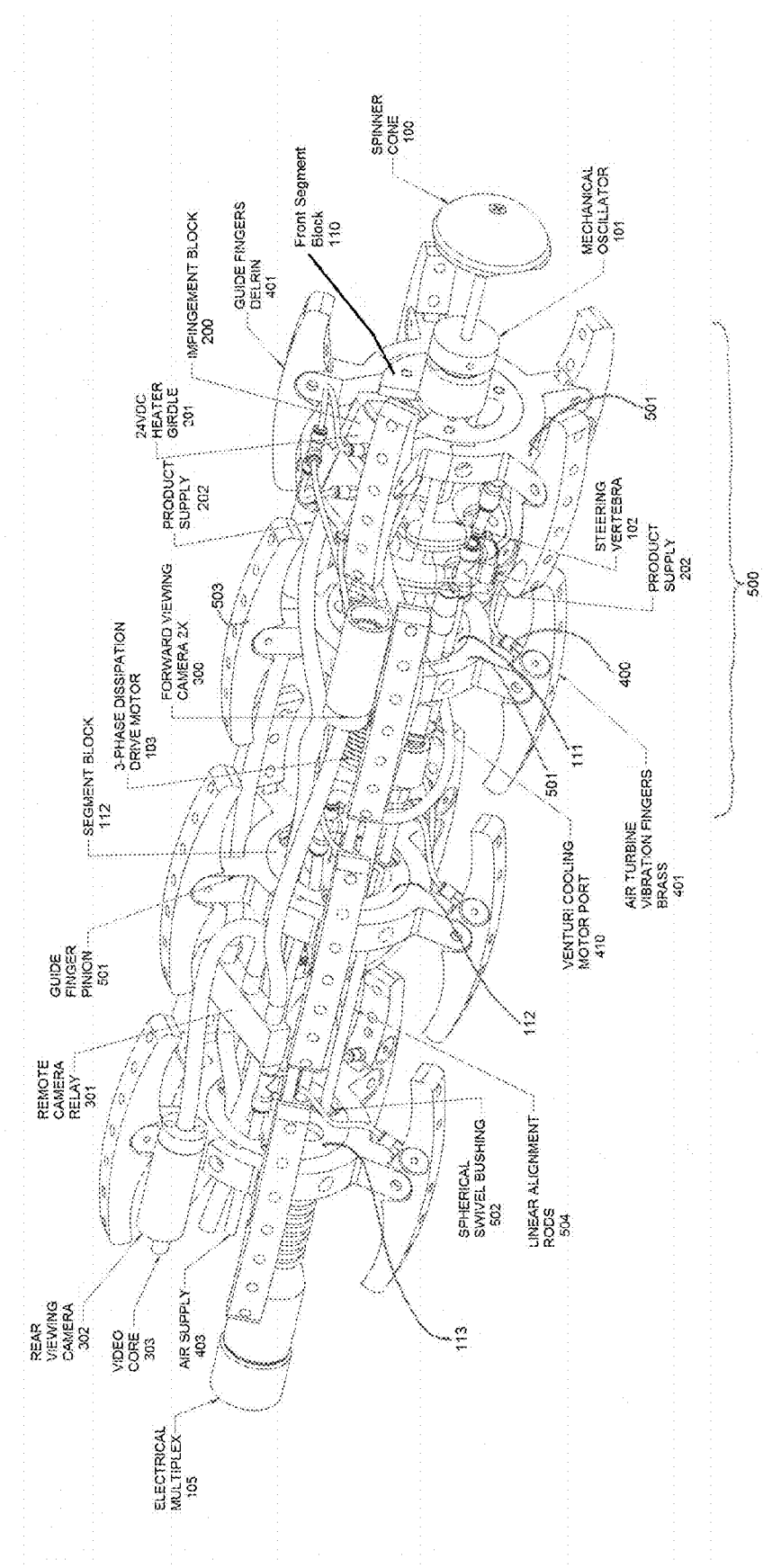
FIG. 1 is a perspective view of the device showing the fingers attached to the segment blocks and the front protruding spinning dissipation component.

FIG. 1 illustrates a perspective view of one embodiment of the disclosure. For reference, the end of the lining apparatus robot (hereafter known as robot) with the designation 100 will be referenced as the front of the robot and the opposite end with the designation 105 will be referenced as the rear of the robot.

The illustration depicts, from the front of the robot, the dissipation device 100 mounted to the rotating shaft and mechanical oscillator 101. The shaft passes through the mechanical oscillator which is attached to the front segment block 110, typical of the individual segment blocks. Surrounding the segment block is attached a guide finger pinion ring 501. Guide fingers are attached and allowed to pivot on the guide finger pinion ring. Some of the fingers 401 may be of brass and attached with high frequency air turbine vibrators 400.

Removably affixed to the back side of the front segment block 110 is the combination impingement block 200 and air cylinder actuator. The air cylinder actuator controls the flow of coating material through the impingement block. The combination block has attached to it 2 product supply lines 202, air supply lines 403 and is jacketed with a 24 VDC heating girdle 201. The first segment block also features the steering vertebrae 102.

The subsequent segment blocks feature the dissipation drive motor 103, venturi motor cooling apparatus 410, forward 300 and reverse 302 viewing cameras, a remote camera relay 301 and an electro pneumatic air solenoid 402. (See FIG. 2)

Intersecting each segment block through the centerline is a spring steel spine wire attached to each segment block. Radially spaced holes in the segment blocks house spherical swivel bushings 502. Passing through these bushings are the linear alignment rods 504. Protruding from the rear of the robot are the air supply lines 403, the video cable 303 and an electrical multiplex connector 105. These connections communicate with an umbilical (not shown) as described in the Summary.

In a pipe lining operation, the robot can be inserted into pipe or conduit and pulled into position using a remotely releasable pulling harness. This harness can be actuated by an electro mechanical solenoid that will detach the harness from the robot and be pulled clear of the repair area. In another embodiment, the umbilical is pulled through the line from a first access point to second access point, passing through the area to be repaired. Once pulled though, the robot is attached to the umbilical. The umbilical can include a load bearing member. The speed of egress is controlled remotely from an operator console and the lining process is monitored via the on board viewing cameras 300, 302. Flow, pressure and speed calculations are used to ensure a desired lining thickness.

Figure 2:
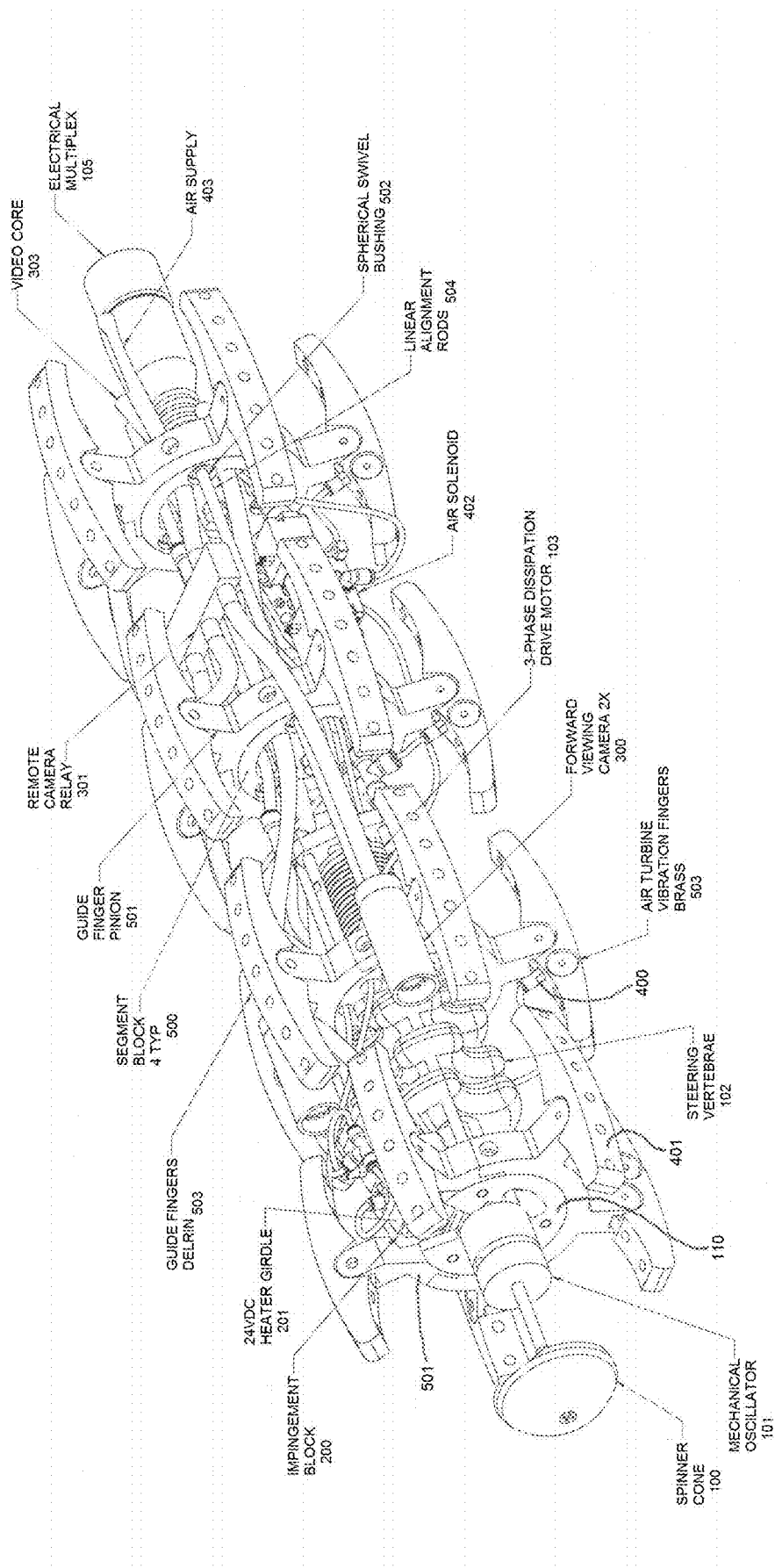
FIG. 2 is another perspective view of the device showing the mounted front and rear cameras and the pneumatically powered vibrators causing a high frequency vibration that is transferred to the solid brass fingers.
Figure 3:
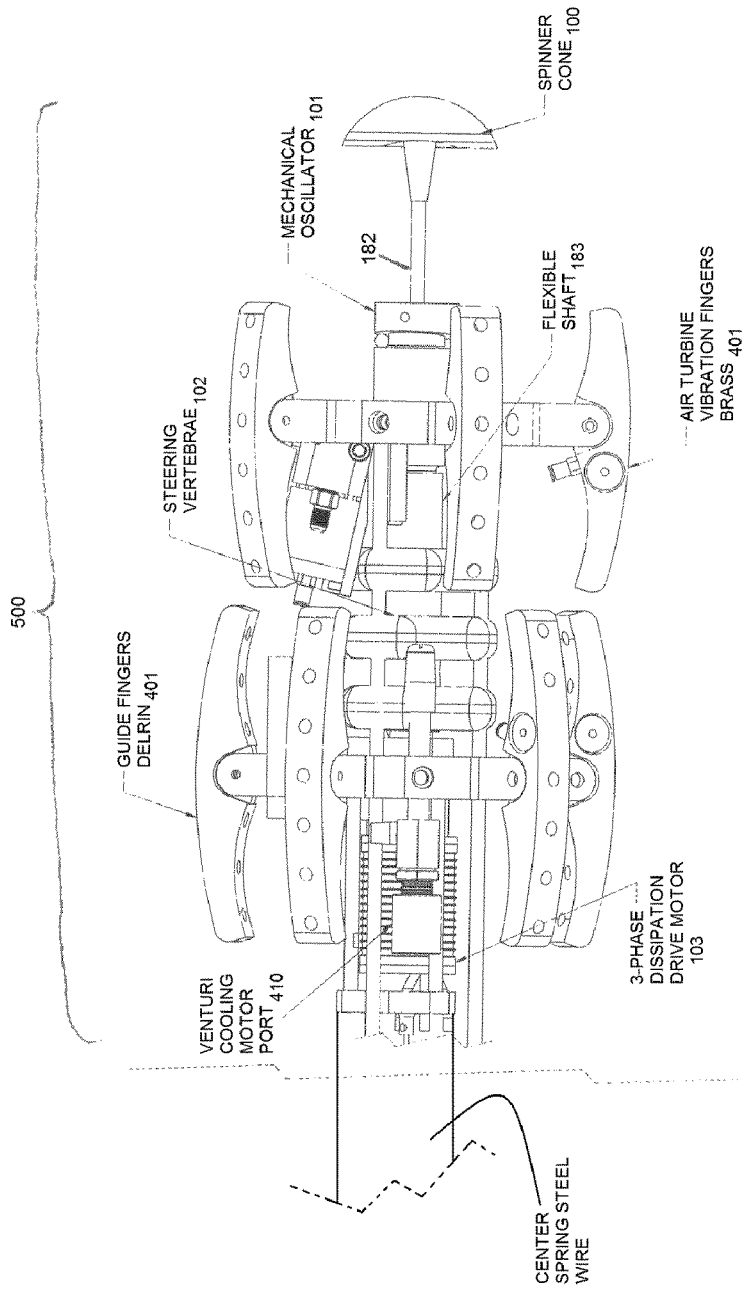
FIG. 3 is a detailed side view showing the steering vertebrae, the front and second segment blocks and the spinner cone (dissipation device), the offset alignment of the two sets of guide fingers and drive motor.

Continuing with FIG. 2, while in a pipeline or conduit, the robot contacts the pipe walls at the guide fingers 503. These guide fingers can be constructed of an engineered plastic such as DELRIN® AF, an acetal-homopolymer with an internal PTFE lubricant manufactured by DuPont. This material provides a low coefficient of friction with toughness and excellent wear resistance. Some of these fingers are also constructed of brass which is considerably heavier and can act as ballast when located at the bottom portion of the guide finger pinion rings 501 to maintain the robot positioned vertically throughout the operation. The brass guide fingers may also contain air turbine vibrators 400. These pneumatically powered vibrators house an off center weighted wheel that spins at 50,000-70,000 rpm causing a high frequency vibration that is transferred to the solid brass fingers. This high frequency vibrations cause the brass guide fingers to "bounce" off of the pipe wall at a miniscule level many times per second severely reducing friction and drag. The curvature of the guide fingers 503 are machined to closely approximate the outside, internal radius of a 90 degree elbow in the size of pipe that the lining will take place. Different guide fingers are used for differing pipe sizes. The guide fingers 503 are attached to the guide finger pinion rings 501 with a shoulder type axel bolt which secures the fingers and allows them to pivot at the attachment point. This is especially useful when negotiating a severe bend in a pipeline where the leading edges of the guide fingers will follow the curvature in the pipe while maintaining alignment with the center of the pipe. The guide finger pinion rings 501 are typically constructed of stainless steel or anodized aluminum and are designed as a split ring to allow for ease of replacement and change out of different sizes for different size pipe. The guide finger pinion rings, holding the guide fingers, are all secured to the segment blocks 500 radially with removable cap screws.

The segment blocks can also be fabricated from stainless steel, aluminum or other suitable materials. FIG. 1 illustrates the front 110 and second (motor) segment 111 with attached components 500. The segment blocks all have a center attachment point for the spring steel spine wire. This steel member, approximately 0.80" in diameter is spring tempered so it remains flexible but returns to its original straight orientation when not under strain. This feature allows the segment block spacing to be maintained, provides an attachment point for some of the devices within the robot and supplies an opposing force to the articulation of the robot while navigating bends in a pipeline. The segment blocks 110, 111, 112 & 113 are also machined to allow passage of product supply lines 202, air supply lines 403 and all electrical, control and video cabling. Additionally, the segment blocks have several bores, radially spaced to accept the spherical swivel bearings 502.

The spherical swivel bearings 502 are linear bearings within a housing that allows axial movement up to 30 degrees. The linear alignment rods 504 pass through these bushings and are fixedly attached to the front segment block only 110. The linear alignment rods may be semi-rigid. During the navigation of a severe bend in a pipeline the linear alignment rods 504 are allowed to slide in a forward and reverse direction as the robot articulates the bend. The segment blocks are maintained in a perpendicular orientation to the centerline of the pipeline. This movement is necessary as the arc length of the interior internal radius is less that the internal outside radius in a pipeline so the difference in these lengths is compensated for by the linear movement of the alignment rods 504 through the spherical swivel bushings 502. This configuration allows the segment blocks 500 to move independent of each other while maintaining both centering in the pipe and perpendicular relationship to the centerline of the pipe.

The front segment block has a removably attached combination impingement block 200 and air actuator. The product supply lines 202 for the 2 liquid components that make up the lining material are attached to this block via removable hose blocks. Passage for the lining materials through the impingement block is blocked by a valving rod that passes through the center of the block. When the valving rod is retracted via the included air cylinder actuator, the high pressure fluids are allowed to enter the internal mixing chamber of the impingement block and exit through a spray port directed at the dissipation device 100 at a distinct trajectory angle. (See FIG. 4, item 181.) The air actuator is a double acting air cylinder where the piston is attached to the valve rod. Extension and retraction of the piston is controlled by a switching solenoid 402 controlled electrically via a signal transmitted through the umbilical. This allows an operator to precisely control the lining material stream. The combo block 200 is mounted on 2 small stainless steel rods mounted to the backside of the front segment block and secured with set screws threaded in the block. This allows the entire block assembly 200 to be easily removed for cleaning and service. The liquid liner components, polyurea, the product of the mixture of isocyanate and amine resin, need to mix between 140 degree F. and 170 degree F. to acquire the physical properties and full cure. The fluid in the product supply lines 202 cools quickly so a 24 VDC heater girdle is provided to heat the entire block assembly 200 appropriately. The heating girdle is self regulating at a temperature between 140 and 170 degrees F. The combo block 200, being constructed from stainless steel has considerable mass which holds the heat and readily transfers it to the liquid liner components.

The front segment block 110 is also machined to accept a pair of rotational bearings for the dissipation device shaft 182. This shaft is typically constructed of stainless steel but alternately titanium or aircraft grade aluminum can be substituted. Connected to this shaft on the front side of the front segment block is a mechanical oscillator. On back side of the front segment block the mechanical oscillator 101 is attached to a transfer shaft. The transfer shaft 183 is in turn connected to a flexible drive shaft attached to the 3 phase dissipation drive motor 103. The bearing arrangement supports the shaft and dissipation cone 100 mounted to the end of the shaft (in front of the front segment block).

The dissipation device (100 or 100A) extends from the front segment block. The dissipation device has a specific geometry designed to allow the lining material stream to decelerate and evenly distribute the material within the second asymmetrical cone before being centrifugally cast to the pipe interior walls. This ensures a uniform liner application over the entire, 360 degree interior pipe surface. The secondary, outer cone can also have a scalloped periphery edge 109 which will render a widened spray pattern over a greater area. This assembly can be constructed of nylon 6/6, DELRIN® plastic, an acetal homopolymer, aluminum or other suitable materials.

The mechanical oscillator 101 operates off of the rotational movement of the shaft 182. Using a wave plate and ball bearing configuration, the rotational movement is transferred to linear movement. This provides a rapid forward and reverse movement of the dissipation device 100. The apparatus has a compounded effect through the cohesive mechanical action on the dissipation of the material stream on to the pipe walls. Through the action of the fast high velocity forward and reverse action and the continuous action of each reciprocal stroke, the cohesive mechanical action produces a "bullwhip" or "wave" geometry of liner material with high velocity. The resulting dissipation stream assures the lining of all sides of profiles in the pipe wall.

In viewing the next segment block 111 from the front towards the rear (motor segment), there is a similar configuration where a segment block 500 is surrounded by a guide finger pinion ring 501 with guide fingers 503 attached radially. To prevent the guide fingers on this segment from contacting the guide fingers on the front segment block, it can be appreciated that the second segment block is rotated approximately 36 degrees so that the guide fingers intermesh providing total coverage and protection of the robotic components. This orientation continues from front to back with all segment blocks.

The second segment block contains the electric motor which ultimately drives the dissipation device 100 and the mechanical oscillator 101. In a preferred embodiment the motor is a three phase dissipation drive motor 103. A suitable motor for this application is a Koford 33 mm series with a 48 VDC winding. Control is provided by high efficiency miniature sensorless drive with 56 k pulsed wave modulation frequency which is located remotely at the operator control console. A preferred drive here is an S48V20A driver also from Koflo. This drive allows remote speed control as well as reversing capability along with temperature and RPM feedback to the operator. An ideal operating speed is between 15,000 rpm and 30,000 rpm depending on the amount of lining material being delivered to the dissipation device 100. The front of the motor has a series of radially spaced tapped holes wherein the motor segment block is machined to match this bolt pattern to allow for secure attachment to the segment block. The three wires to the motor extend back through the robot and terminate in the electrical multiplex connector 105.

Because the motor and shaft occupy the center of the motor segment block, stainless steel stand offs are provided that are attached to the segment and terminate and attach to a flat steel plate at the rear of the motor. The flat steel plate contains a receptor for attaching the spring steel spine wire. The motor shaft is machined to mate with a connector on a flexible shaft 183. The flexible shaft connects the motor shaft to the transfer shaft 182. The transfer shaft protrudes from the back of the front segment block and, in turn, transfers rotational energy to the mechanical oscillator 101 and ultimately the dissipation device 100. The flexible shaft is a wire wound, casing-less, bi-directional flex shaft capable of very high speed and excellent torsional stability. A suitable custom shaft for this application is available from S.S. White Technologies, Inc. In one embodiment, a machined hose barb profile with a center through bore may be included on the back of the front segment block and the front of the second segment block to accept a protective hose to house the flexible shaft and provide a flexible tensile strength member between the two segment blocks. The hose is secured to the hose barb profiles with circumferential clamps.

In certain instances it may be necessary to forcibly increase the angle of the front segment block beyond a plane perpendicular to the centerline of the pipe to ensure that the dissipation device 100 remains as close to the pipe centerline as possible. This is especially important in smaller diameter pipelines where space is restricted. This can be achieved through a variety of novel mechanisms. In one embodiment, steering vertebrae 102 surround the linear alignment rods 504 between the front segment block and the second, motor mount segment block. These vertebrae are electro-mechanical actuators that extend and retract according to either operator input or automatically through a PLC in combination with proximity sensors. As the robot passes through a tight bend in, for example, a 6 inch diameter pipe, the dissipation device can be positioned very close to the outside radius of the bend. Here, the vertebrae actuator in proximity with the interior radius of the bend is retracted and the actuator opposite is extended to force the segment block to increase its angle relative to the centerline of the pipe. This brings the dissipation device closer to the pipe centerline. This is necessary due to the pendulum effect on the dissipation device. It will be appreciated that this effect is the result of the dissipation device extending several inches from the face of the front segment block.

In another embodiment, changing the angle of the front segment block in relation to the pipe centerline can be achieved through the use of electric servo motors 150 and cables 152 running parallel to each of the linear alignment rods 504. Reference is made to FIGS. 6 and 7. The servo motors are equipped with miniature take up spools 153 on which the servo motor cables are wound. Running the servo motors in one direction will cause the corresponding cable to retract while running in reverse will allow cable to extend out. These servo cables pass through bushed holes in all segment blocks and are attached to the back side of the front (first) segment block 110. Again, either by operator input or PLC based control the servo motors can be synchronized to change the angle of the front segment block in relation to the pipe centerline.

Still another embodiment employs miniature, hollow core electric screw actuators where a threaded die rotates within the actuator. The electro-mechanical actuators can be mounted on the front of the second segment block in place of the spherical swivel bushings. The linear guide rods have an externally threaded portion in this area to match the thread on the hollow core screw actuators. By synchronizing the rotations of the screw actuators, the linear alignment rods are extended and retracted to cause the front segment block to change its angle in relation to the pipe centerline.

Real time video surveillance is necessary during a pipe lining operation to monitor and insure proper functionality. A rear facing camera 302 is desired to view the area in the pipe that the robot is approaching where a forward facing camera 300 allows an operator to view the product dissipation. Video recording of the lining operation also provides a digital record for the pipeline owner. This invention teaches using both forward and reverse facing cameras. These cameras can be either 12 VDC or 24 VDC, and are high resolution, solid state CCD sensor cameras with automatic iris adjust and sensitivity down to 1 lux. The cameras are also equipped with built in white or UV LED lights. The waterproof aluminum housings allow the cameras to be mounted in several locations along the guide finger pinion rings 501. A remote switching camera relay 301 is mounted between 2 of the segment blocks and protected by the guide fingers 503. This allows an operator to remotely switch between forward and rear facing cameras and also allows for a simultaneous split screen or picture in picture display.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

The invention claimed is:

1. A multi-segmented, flexible pipe lining device comprising
   a) a plurality of segment blocks comprising said device;
   b) a flexible center spring component of bendable wire attached to the center of each segment block to maintain a longitudinal orientation of the segment blocks;
   c) a plurality of parallel linear alignment rods extending longitudinally through slideably connecting swivel bearings mounted on the radial periphery of the segment blocks, said swivel bearings allowing axial movement of the alignment rods and providing independent movement of the segment blocks, and
   d) a dissipation device mounted in an axial center at an end of the device.

2. The multi-segmented, flexible pipe lining device of claim 1 further comprising at least one linear alignment rod that is flexible.

3. The multi-segmented, flexible pipe lining device of claim 1 further comprising guide finger pinion rings and pivoting guide fingers.

4. The multi-segmented, flexible pipe lining device of claim 3 further comprising pivoting guide fingers having a curved outer surface substantially equal to the outside internal radius of a pipe bend.

5. The multi-segmented, flexible pipe lining device of claim 1 further comprising at least one pivoting guide finger operably connected to an air turbine vibrator.

6. The multi-segmented, flexible pipe lining device of claim 1 further comprising positioning the guide pinion rings on each segment block in an offset radial orientation.

7. The multi-segmented, flexible pipe lining device of claim 1 further comprising two or more expandable and retractable rigid steering vertebrae operably and radially connected to at least one segment block in two different radial positions wherein one steering vertebrae is expanded and the other steering vertebrae retracts.

8. The multi-segmented, flexible pipe lining device of claim 7 further comprising the expandable and retractable steering vertebrae wherein the steering vertebrae is remotely controllable.

9. The multi-segmented, flexible pipe lining device of claim 8 wherein the remotely controllable expandable and retractable steering vertebrae maneuvers a lining dissipation component to the center of a pipe bend.

10. The multi-segmented, flexible pipe lining device of claim 8 wherein the remotely controllable expandable and retractable steering vertebrae are electro-mechanical actuators that extend or retract.

11. A multi-segmented, flexible pipe lining device comprising a plurality of independently oriented segment blocks joined by a flexible center component and pipe lining device components are each mounted to only one segment block surface of at least one segment block.

12. A multi-segmented, flexible pipe lining device of claim 11 further comprising a rotatable pipe lining dissipation device extending from a front segment block.

13. A multi-segmented, flexible pipe lining device of claim 12 wherein the pipe lining dissipation device is positioned substantially in the center of a pipe bend while the multi-segmented, flexible pipe lining device traverse through the pipe bend.

14. A multi-segmented, flexible pipe lining device of claim 12 wherein the front segment block is positioned at an angle beyond a plane perpendicular to the centerline of the pipe.

15. A multi-segmented, flexible pipe lining device of claim 12 wherein the pipe lining dissipation device is positioned substantially in the center of a pipe bend by simultaneously retracting a steering vertebrae and extending a different steering vertebrae.

* * * * *

UNITED STATES PATENT AND TRADEMARK OFFICE
CERTIFICATE OF CORRECTION

PATENT NO. : 8,402,911 B1  
APPLICATION NO. : 13/552714  
DATED : March 26, 2013  
INVENTOR(S) : Kent Weisenberg Page 1 of 1

It is certified that error appears in the above-identified patent and that said Letters Patent is hereby corrected as shown below:

IN THE CLAIMS

Claim 11, at Column 9, line 17, after "component", please insert --,--  
Claim 11, at Column 9, line 18, after "components", please delete "are".

Signed and Sealed this  
Fifth Day of January, 2016

Michelle K. Lee  
*Director of the United States Patent and Trademark Office*